United States Patent
Shi et al.

(10) Patent No.: US 12,107,712 B2
(45) Date of Patent: Oct. 1, 2024

(54) METHOD AND APPARATUS FOR TRANSMITTING DOWNLINK CONTROL INFORMATION

(71) Applicant: ZTE CORPORATION, Shenzhen (CN)

(72) Inventors: Jing Shi, Shenzhen (CN); Peng Hao, Shenzhen (CN); Xingguang Wei, Shenzhen (CN); Wei Gou, Shenzhen (CN); Xianghui Han, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 410 days.

(21) Appl. No.: 17/599,939

(22) PCT Filed: Mar. 23, 2020

(86) PCT No.: PCT/CN2020/080678
§ 371 (c)(1),
(2) Date: Sep. 29, 2021

(87) PCT Pub. No.: WO2020/199958
PCT Pub. Date: Oct. 8, 2020

(65) Prior Publication Data
US 2022/0200835 A1    Jun. 23, 2022

(30) Foreign Application Priority Data
Mar. 29, 2019  (CN) ............................ 201910253189

(51) Int. Cl.
*H04W 4/00*      (2018.01)
*H04L 27/26*     (2006.01)
(Continued)

(52) U.S. Cl.
CPC ............... *H04L 27/26025* (2021.01); *H04W 72/0446* (2013.01); *H04W 72/1263* (2013.01); *H04W 72/23* (2023.01)

(58) Field of Classification Search
CPC ............ H04W 72/23; H04W 72/0446; H04W 72/1263
See application file for complete search history.

(56) References Cited

U.S. PATENT DOCUMENTS

| 10,524,284 B2 * | 12/2019 | Bagheri | ............... H04W 72/044 |
| 2014/0293843 A1* | 10/2014 | Papasakellariou | .... H04L 5/0037 370/280 |
| 2019/0149380 A1* | 5/2019 | Babaei | .............. H04W 72/0446 370/330 |

(Continued)

FOREIGN PATENT DOCUMENTS

| CN | 108631969 A | 10/2018 |
| WO | WO-2018064590 A | 4/2018 |
| WO | WO-2019033389 A1 | 2/2019 |

OTHER PUBLICATIONS

Korean Office Action in Application No. 10-2021-7035301, dated Mar. 3, 2023, 10 pages including translation.

(Continued)

*Primary Examiner* — Abdelnabi O Musa
(74) *Attorney, Agent, or Firm* — Morgan, Lewis & Bockius LLP (57) ABSTRACT

Method and apparatus for transmitting downlink control information (DCI) are provided. The method includes: scheduling traffic channels in multiple transmission time intervals (TTIs) through a single DCI, where a subcarrier spacing of a carrier where the scheduled traffic channel is located is not smaller than a subcarrier spacing of a carrier where the DCI scheduling the traffic channel is located; and transmitting the DCI. A problem of how to use a multi-TTI scheduling for a cross-carrier scheduling in which a subcarrier spacing of a scheduling carrier is smaller than a sub- (Continued)

carrier spacing of a scheduled carrier in the related art may be solved, and the effects of scheduling the multiple TTIs through a single DCI and reducing the overhead are achieved.

14 Claims, 3 Drawing Sheets

(51) Int. Cl.
    *H04W 72/0446* (2023.01)
    *H04W 72/1263* (2023.01)
    *H04W 72/23* (2023.01)

(56) References Cited

U.S. PATENT DOCUMENTS

| | | | |
|---|---|---|---|
| 2019/0268931 A1* | 8/2019 | He | H04W 76/28 |
| 2019/0327755 A1* | 10/2019 | Xiong | H04L 5/0046 |
| 2019/0334688 A1* | 10/2019 | Kwak | H04W 72/23 |
| 2019/0342030 A1* | 11/2019 | Hosseini | H04L 1/00 |
| 2020/0029354 A1* | 1/2020 | Hwang | H04W 72/044 |
| 2020/0100225 A1* | 3/2020 | Khoshnevisan | H04L 1/1854 |
| 2021/0167930 A1* | 6/2021 | Jeon | H04L 27/2607 |
| 2021/0314984 A1* | 10/2021 | Yang | H04L 5/0044 |

OTHER PUBLICATIONS

MediaTek Inc., "Remaining issues in carrier aggregation", 3GPP TSG RAN WG1 Meeting #92bis, R1-1804046, Sanya, China, Apr. 16-20, 2018, 10 pages.

International Search Report for Application No. PCT/CN2020/080678, dated Jun. 15, 2020, 4 pages including English translation.

Samsung, "Remaining Scheduling Aspects for CA Operation", *3GPP TSG RAN WG1 Meeting NR#3, R1-1716022*, Sep. 12, 2017 (Sep. 12, 2017), sections 1-3.

Extended European Search Report for Application No. 20784193.3, dated Nov. 15, 2022, 15 pages.

Huawei, "Feature lead summary of HARQ enhancements for NR-U", 3GPP TSG RAN WG1 Meeting #96, R1-1903423, Athens, Greece, Feb. 25-Mar. 1, 2019, 13 pages.

Oppo, "Resource allocation for PDSCH/PUSCH", 3GPP TSG RAN WG1 Meeting 91, R1-1719973, Reno, USA, Nov. 27-Dec. 1, 2017, 10 pages.

Nokia et al., "Feature lead summary on Cross-carrier Scheduling with Different Numerologies", 3GPP TSG RAN WG1 Meeting #96, R1-1903695, Athens, Greece, Feb. 25-Mar. 1, 2019, 17 pages.

Qualcomm, "Enhancements to Scheduling and HARQ operation for NR-U", 3GPP TSG RAN WG1 Meeting #96, R1-1902987, Athens, Greece, Feb. 25-Mar. 1, 2019, 12 pages.

\* cited by examiner

METHOD AND APPARATUS FOR TRANSMITTING DOWNLINK CONTROL INFORMATION

CROSS-REFERENCE TO RELATED APPLICATION

The present application is a U.S. National Stage Application, filed under 35 U.S.C. 371, of International Patent Application No. PCT/CN2020/080678, filed on Mar. 23, 2020, which claims priority to Chinese Patent Application No. 201910253189.8, filed with the China National Intellectual Property Administration (CNIPA) on Mar. 29, 2019, the contents of which are incorporated herein by reference in their entireties.

TECHNICAL FIELD

The present application relates to the field of communications, and for example, to a method and an apparatus for transmitting downlink control information.

BACKGROUND

Figure 1:
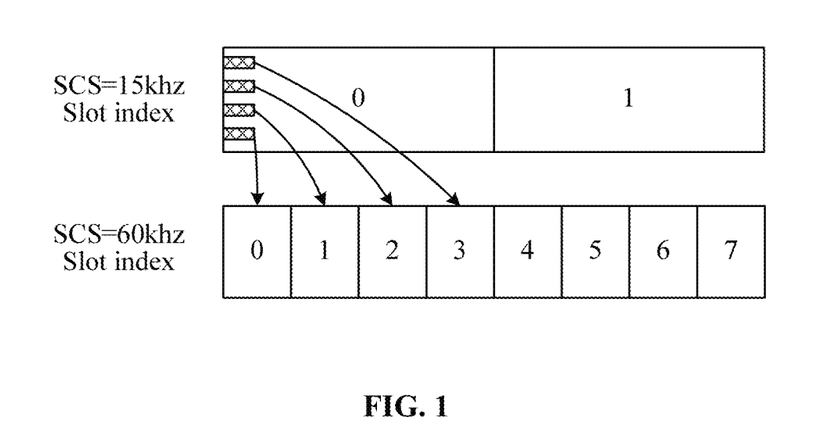
FIG. 1 is a schematic diagram of multiple DCIs scheduling multiple slots according to the related art.

At present, there is an increasing demand in the 4th generation mobile communication technology (4G) long-term evolution (LTE)/long-term evolution advance (LTE-A), and the 5th generation mobile communication technology (5G). From a current development trend, 4G and 5G systems now research on supporting the characteristics of enhanced mobile broadband, ultra-high reliability, ultra-low delay transmission and massive connection. At present, carrier aggregation (CA) technology in the 5G system is more complex than that in the 4G system, and a cross-carrier scheduling between carriers with different subcarrier spacings (SCS) needs to be solved. At present, NR R16 CA needs to support a cross-carrier scheduling between different subcarrier spacings. FIG. 1 is a schematic diagram of multiple DCIs scheduling multiple slots according to the related art, as shown in FIG. 1, 4 slots are scheduled through 4 DCIs. However, for a case that a subcarrier spacing of a scheduling carrier is smaller than a subcarrier spacing of a scheduled carrier, it is not allowed to use multiple DCIs to schedule traffic channels in multiple slots at one moment at present.

Therefore, in order to use small subcarrier spacing to perform cross-carrier scheduling on multiple slots having large subcarrier spacing, there are two schemes at present. One scheme is to introduce a new UE capability to an R16 terminal to support demodulating, at one moment, multiple pieces of downlink control information (DCI). The other scheme is to support multi-slot scheduling in the R16, and multiple slots are scheduled using a single DCI. At present, there is no specific scheme for how to use the multi-slot scheduling for a cross-carrier scheduling in which a subcarrier spacing of a scheduling carrier is smaller than a subcarrier spacing of a scheduled carrier. Therefore, there is a need to address how to support the multi-slot scheduling in the R16.

For a problem of how to use a multi-TTI scheduling for the cross-carrier scheduling in which the subcarrier spacing of the scheduling carrier is smaller than the subcarrier spacing of the scheduled carrier in the related art, no scheme has been proposed.

SUMMARY

Embodiments of the present application provide a method and apparatus for transmitting downlink control information to at least solve a problem of how to use a multi-TTI scheduling for a cross-carrier scheduling in which a subcarrier spacing of a scheduling carrier is smaller than a subcarrier spacing of a scheduled carrier in the related art.

According to an embodiment of the present application, a method for transmitting downlink control information is provided. The method includes: traffic channels in multiple transmission time intervals (TTIs) are scheduled through a single downlink control information (DCI), where a subcarrier spacing of a carrier where the scheduled traffic channel is located is not smaller than a subcarrier spacing of a carrier where the DCI scheduling the traffic channel is located; and the DCI is transmitted.

According to another aspect of the embodiments of the present application, an apparatus for transmitting downlink control information is further provided. The apparatus includes a scheduling module and a transmitting module. The scheduling module is configured to schedule traffic channels in multiple transmission time intervals (TTIs) through a single downlink control information (DCI), where a subcarrier spacing of a carrier where the scheduled traffic channel is located is not smaller than a subcarrier spacing of a carrier where the DCI scheduling the traffic channel is located. The transmitting module is configured to transmit the DCI.

According to still another embodiment of the present application, a storage medium is further provided. The storage medium stores a computer program, where the computer program is configured to perform, when executed, the steps in any one of the method embodiments described above.

According to still another embodiment of the present application, an electronic apparatus is further provided. The electronic apparatus includes a memory and a processor. The memory stores a computer program, and the processor is configured to execute the computer program to perform the steps in any one of the method embodiments described above.

According to the present application, the traffic channels in the multiple transmission time intervals (TTIs) are scheduled through the single downlink control information (DCI), where the subcarrier spacing of the carrier where the scheduled traffic channel is located is not smaller than the subcarrier spacing of the carrier where the DCI scheduling the traffic channel is located; the DCI is transmitted. In this way, a problem of how to use a multi-TTI scheduling for a cross-carrier scheduling in which a subcarrier spacing of a scheduling carrier is smaller than a subcarrier spacing of a scheduled carrier in the related art may be solved, and the effects of scheduling the multiple TTIs through the single DCI and reducing the overhead are achieved.

BRIEF DESCRIPTION OF DRAWINGS

The accompanying drawings described herein are intended to provide a further understanding of the present application and form a part of the present application. The illustrative embodiments of the present application and the description thereof are intended to explain the present application and do not constitute an undue limitation on the present application. In the drawings.

DETAILED DESCRIPTION

The present application will be described in detail below with reference to the accompanying drawings in conjunction with embodiments. It should be noted that embodiments and features of the embodiments in the present application may be combined with each other without conflict.

It should be noted that the terms "first," "second," and the like in the Description and claims of the present application and in the accompanying drawings are used for distinguishing between similar objects and not necessarily for describing a particular sequential or chronological order.

First Embodiment

Figure 2:
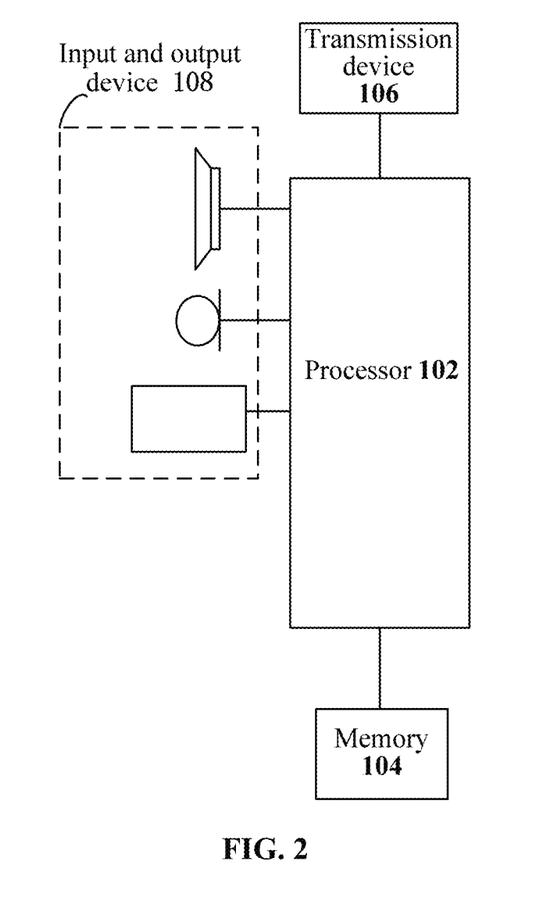
FIG. 2 is a hardware structure block diagram of a mobile terminal executing a method for transmitting downlink control information according to an embodiment of the present application.

A method provided in a first embodiment of the present application may be executed in a mobile terminal, a computer terminal, or a similar computing apparatus. An example in which the method is executed in a mobile terminal is used. FIG. 2 is a hardware structure block diagram of the mobile terminal which executes a method for transmitting downlink control information according to an embodiment of the present application. As shown in FIG. 2, a mobile terminal 10 may include one or more processors 102 (only one processor is shown in FIG. 2) and a memory 104 for storing data. The processor 102 may include but is not limited to a processing device such as a microprocessor (MCU) or a programmable logic device (FPGA). Optionally, the mobile terminal described above may further include a transmission apparatus 106 for a communication function and an input and output device 108. It should be understood by those of ordinary skill in the art that the structure shown in FIG. 2 is only an illustration and is not intended to limit the structure of the mobile terminal described above. For example, the mobile terminal 10 may further include more or fewer assemblies than shown in FIG. 2, or have a different configuration from that shown in FIG. 2.

The memory 104 may be used for storing computer programs, for example, software programs and modules of an application software, such as a computer program corresponding to a message receiving method in embodiments of the present application. The processor 102 executes various functional applications and data processing by executing the computer programs stored in the memory 104, i.e., implements the above-described method. The memory 104 may include a high-speed random access memory, and may further include a non-volatile memory such as one or more magnetic storage devices, a flash memory, or other non-volatile solid-state memories. In some instances, the memory 104 may further include a memory remotely disposed relative to the processor 102, which may be connected to the mobile terminal 10 via a network. Instances of the network described above include, but are not limited to, Internet, intranet, local area network, mobile communication network, and combinations thereof.

The transmission apparatus 106 is used for receiving or sending data via a network. Specific instances of the network described above may include a wireless network provided by a communication provider of the mobile terminal 10. In one instance, the transmission apparatus 106 includes a network adapter (network interface controller, NIC for short) that may be connected to other network devices through a base station to communicate with the Internet. In one instance, the transmission apparatus 106 may be a radio frequency (RF) module, which is used for communicating with the Internet in a wireless manner.

Figure 3:
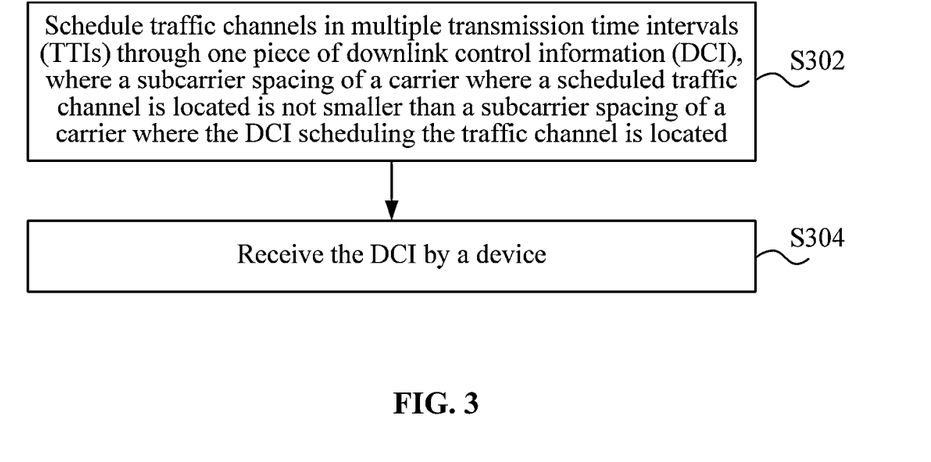
FIG. 3 is a flowchart of a method for transmitting downlink control information according to an embodiment of the present application.

In an embodiment, a method for transmitting downlink control information is provided, which is applied to a base station; the DCI is sent to the mobile terminal after slot aggregation. FIG. 3 is a flowchart of a method for transmitting downlink control information according to an embodiment of the present application, and as shown in FIG. 3, the flowchart includes following steps.

In step S302, traffic channels in multiple transmission time intervals (TTIs) are scheduled through a single downlink control information (DCI), where a subcarrier spacing of a carrier where a scheduled traffic channel is located is not smaller than a subcarrier spacing of a carrier where the DCI scheduling the traffic channel is located.

A subcarrier spacing of a carrier where the traffic channel is located is preferably a subcarrier spacing of an activated bandwidth part (BWP) in the carrier where the traffic channel is located, that is, one or more BWPs may be configured in the carrier and each BWP may be independently configured with a subcarrier spacing; or is preferably the subcarrier spacing of the carrier where the traffic channel is located (here, it is an entire carrier rather than divided into BWPs). Similarly, a subcarrier spacing of a carrier where the DCI is located is preferably a subcarrier spacing of an activated BWP in the carrier where the DCI is located or the subcarrier spacing of the carrier where the DCI is located. In addition, it may be described into a subcarrier spacing of a carrier where a PDCCH is located by replacing the DCI into the PDCCH, since the DCI is carried in the PDCCH, i.e., it is preferable that a channel over which the DCI is transmitted is a physical downlink control channel (PDCCH).

The downlink control information (DCI) may be a DL assignment scheduling a PDSCH, or a UL grant scheduling a PUSCH.

In step S304, the DCI is transmitted.

Through the steps S302 to S304 described above, the traffic channels in the multiple transmission time intervals (TTIs) are scheduled through the single downlink control information (DCI), where the subcarrier spacing of the carrier where the scheduled traffic channel is located is not smaller than the subcarrier spacing of the carrier where the DCI scheduling the traffic channel is located; and then the DCI is transmitted. In this way, a problem of how to use a multi-TTI scheduling for a cross-carrier scheduling in which a subcarrier spacing of a scheduling carrier is smaller than a subcarrier spacing of a scheduled carrier in the related art may be solved, and effects of scheduling multiple TTIs through a single DCI and reducing the overhead are achieved.

In an optional embodiment, the step S302 described above may specifically include indicating a number of scheduled TTIs by the DCI in one of following manners:

- a bit number of a bit field of the number of the scheduled TTIs is determined according to a subcarrier spacing of a scheduled carrier and a subcarrier spacing of a scheduling carrier; scheduled TTIs in at most N or $2^N$ TTIs except and after a first scheduled TTI are indicated by N bits, where the $2^N$ TTIs are continuous TTIs, and N is a natural number;
- a single TTI scheduling or a multi-TTI scheduling is indicated by 1 bit;
- a number of TTIs or a number of repetitions of a multi-TTI scheduling is indicated through a same bit field; or
- a number of TTIs of a multi-TTI scheduling is implicitly determined through a related parameter of a physical downlink control channel (PDCCH).

In a case where the single TTI scheduling or the multi-TTI scheduling is indicated by the 1 bit, the number of the TTIs of the multi-TTI scheduling is determined by a predefined manner or configured by a radio resource control (RRC).

Further, the bit number of the bit field of the number of the scheduled TTIs is determined according to the subcarrier spacing of the scheduled carrier and the subcarrier spacing of the scheduling carrier in following manners:

$$\log_2 \frac{2^{\mu_{PDSCH}}}{(2^{\mu_{PDCCH}})} \text{ or } \log_2 \frac{2^{\mu_{PUSCH}}}{(2^{\mu_{PDCCH}})},$$

where, $\mu_{PDSCH}$ is an index of a subcarrier spacing of a physical downlink shared channel (PDSCH) of the scheduled carrier, $\mu_{PUSCH}$ is an index of a subcarrier spacing of a physical uplink shared channel (PUSCH) of the scheduled carrier, and $\mu_{PDCCH}$ is an index of a subcarrier spacing of the PDCCH of the scheduled carrier.

In the embodiment of the present application, when SCS=15 khz, $\mu$=0; when SCS=30 khz, $\mu$=1; when SCS=60 khz, $\mu$=2; when SCS=120 khz, $\mu$=3; and when SCS=240 khz, $\mu$=4.

Further, the indicating the scheduled TTIs in the at most N or $2^N$ TTIs except and after the first scheduled TTI by the N bits includes one of:

- whether each TTI of adjacent N TTIs after the first TTI is scheduled or not is indicated by the N bits;
- whether each TTI of N TTIs belonging to a first set after the first TTI is scheduled or not is indicated by the N bits, where the N TTIs are N TTI positions selected backwards in the first set from a value of an element A in the first set indicated in the DCI, and the first set is all values of timing intervals in a time domain resource allocation configured by high-layer signaling; x continuous TTIs scheduled in $2^N$ TTIs after the first TTI are indicated by the N bits, where x=1, 2, . . . , $2^N$; or
- x continuous TTIs scheduled in $2^N$ TTIs belonging to a first set after the first TTI are indicated by the N bits, where x=1, 2, . . . , $2^N$, and the $2^N$ TTIs are $2^N$ TTI positions selected backwards in the first set from a value of an element A in the first set indicated in the DCI, and the first set is all values of timing intervals in a time domain resource allocation configured by high-layer signaling.

The timing interval described above is $K_0$ or $K_2$, i.e., the first set may be either a $K_0$ set (when the PDSCH is scheduled) or a $K_2$ set (when the PUSCH is scheduled).

Further, the number of the TTIs or the number of repetitions of the multi-TTI scheduling is indicated through the same bit field in one of following manners: the number of the TTIs or the number of repetitions of the multi-TTI scheduling is indicated through the same bit field and determined by high-layer signaling configuration; or the number of the TTIs or the number of repetitions of the multi-TTI scheduling is indicated through the same bit field and determined by physical signaling indication. It is preferred that the number of the TTIs and the number of repetitions of the multi-TTI scheduling are indicated through 1 bit in DCI.

Further, the number of the TTIs of the multi-TTI scheduling is implicitly determined through the related parameter of the PDCCH may specifically include one of: the number of the TTIs of the multi-TTI scheduling is determined through a starting CCE position; the number of the TTIs of the multi-TTI scheduling is determined through a starting CCE position and an M-bit indication; the number of the TTIs of the multi-TTI scheduling is determined through a candidate position or an aggregation level, where the candidate may be a candidate of the PDCCH; the number of the TTIs of the multi-TTI scheduling is determined through a candidate position and M bits; or the number of the TTIs of the multi-TTI scheduling is determined through an aggregation level and an M-bit indication. Here, M is less than N, optionally, M=N−1.

In the embodiment of the present application, when the DCI is used for indicating a number of TTIs and a number of repetitions of a multi-TTI scheduling, a repetitive transmission is first performed and then a transmission of a different transmission block is performed; or transmissions of different transmission blocks are firstly performed and then a repetitive transmission is performed.

In an optional embodiment, the step S302 described above may specifically include indicating a time domain resource allocation by the DCI in one of following manners:

- a timing interval, a starting symbol of a first TTI, and an ending symbol in a last TTI are configured through high-layer signaling;
- a timing interval, a starting symbol of a first TTI, a number of scheduled TTIs, and an ending symbol in a last TTI are configured through high-layer signaling;
- a timing interval, a starting symbol of a first TTI, a number of symbols, and a number of scheduled TTIs are configured through high-layer signaling;
- a timing interval, a starting symbol and a number of symbols indicated for each TTI or each group of TTIs, and a number of scheduled TTIs are configured through high-layer signaling, where the starting symbol and the number of the symbols are not all the same for individual TTI; or
- a timing interval, a starting symbol of a first TTI, a number of symbols, a number of scheduled TTIs, and a number of subslots/mini-slots within the scheduled TTIs are configured through high-layer signaling.

The high-layer signaling described above may be a radio resource control (RRC).

In an embodiment of the present application, when the physical downlink shared channel (PDSCH) is transmitted in the multiple TTIs, a manner of performing a hybrid automatic repeat request-acknowledgement (HARQ-ACK) feedback on the PDSCH includes one of: using, by each TTI of the multiple TTIs, the each TTI as a timing starting point, and determining an uplink TTI where HARQ-ACK information corresponding to the each TTI is located according to a feedback timing $K_1$ indicated by the DCI, individually;

or using, by each TTI of the plurality of TTIs, a last TTI as a timing starting point, and determining an uplink TTI where HARQ-ACK information corresponding to the multiple TTIs is located according to a feedback timing $K_1$ in the DCI.

In an embodiment of the present application, when the HARQ-ACK is fed back through a semi-static codebook, if a PDSCH determined by using a $K_1$ set configured by high-layer signaling belongs to PDSCHs in a multi-TTI scheduling, then the DCI scheduling the PDSCH is determined as a last DCI.

Optionally, the using, by each TTI of the plurality of TTIs, the each TTI as the timing starting point and determining the uplink TTI where the HARQ-ACK information corresponding to the each TTI is located according to the feedback timing $K_1$ indicated by the DCI, individually include one of: when the HARQ-ACK is fed back through a dynamic codebook, if there are HARQ-ACKs which are fed back for scheduling a first PDSCH and indicate a same uplink TTI, then one is added additionally to a downlink allocation index (DAI) of at least one DCI of DCIs for scheduling the first PDSCH; or when the HARQ-ACK is fed back through a dynamic codebook, if there are HARQ-ACKs which are fed back for scheduling a first PDSCH and indicate one same uplink TTI, then HARQ-ACK information corresponding to PDSCHs of a multi-TTI scheduling is located at the beginning of the dynamic codebook.

In an embodiment of the present application, in a case where HARQ-ACK information corresponding to the PDSCHs of the multi-TTI scheduling is located at the beginning of the dynamic codebook, the PDSCHs of the multi-TTI scheduling are ordered are ordered according to one of following principles: ordered at the beginning of the codebook according to an order of carrier (CC) indexes and then according to an order of time domain; or ordered at the beginning of the codebook according to an order of time domain and then according to an order of CC indexes. That is, ordering is performed according to an ascending order of carrier indexes; where the time domain may refer to an order in time, or an order of PDSCH occasions.

Optionally, the using, by each TTI of the plurality of TTIs, the last TTI as the timing starting point and determining the uplink TTI where the HARQ-ACK information corresponding to the multiple TTIs is located according to the feedback timing $K_1$ in the DCI include: in a case that the HARQ-ACK uses a dynamic codebook for feedback and 1 is added to the DCI by a count DAI, a size of the codebook is determined according to an actual scheduled number for scheduling the multiple TTIs.

In an optional embodiment, coding block group transmission information (CBGTI) is determined by the DCI in one of following manners: a CBGTI of each TTI of the multiple TTIs is independently indicated, where each TTI uses X/Y bits, X is a number of scheduled TTIs, and Y is a maximum number of coding block groups (CBGs) configured by a radio resource control (RRC); or a same CBGTI is shared by multiple TTIs, where TTIs where a new data indicator (NDI) is not toggled share a same CBGTI indication, and TTIs where the NDI is toggled ignore a CBGTI indication.

In another embodiment, coding block group refresh information (CBGFI) is determined by the DCI in one of following manners: CBGFI for each TTI of the multiple TTIs is independently indicated, where 1 bit is used for the each TTI for a maximum of N scheduled TTIs; or using N1 bits to indicate CBGFI of TTIs where a new data indicator (NDI) is not toggled, where N1 is not greater than N; or multiple TTIs share same CBGFI, where TTIs where an NDI is not toggled share a same CBGFI indication, and TTIs where the NDI is toggled ignore a CBGFI indication.

In the embodiments of the present application, a demodulation reference signal (DMRS) pattern in the multiple TTIs is determined in one of following manners: a same DMRS pattern is used by the multiple TTIs and is the same as a DMRS pattern in a first TTI, and the DMRS pattern in the first TTI is determined by combining a time domain resource allocation with an RRC configuration; a DMRS pattern in a first TTI is determined by combining a time domain resource allocation with an RRC configuration, and a first DMRS pattern is used for a TTI continuously occupying 14 orthogonal frequency division multiplexing symbols (OSs), where the first DMRS pattern is determined by an RRC or a predefined manner; or a same DMRS pattern is used by the multiple TTIs and is the same as a DMRS pattern in a first TTI, TTIs applying the DMRS pattern are determined by configuring a TTI pattern, where the DMRS pattern of the first TTI is determined by combining a time domain resource allocation with a radio resource control (RRC) configuration.

Multi-slot scheduling may also be referred to as the multi-TTI scheduling, a unit of the TTI may be a time unit such as a slot, a subframe, a mini-slot or a subslot. The embodiments of the present application are illustrated only by using the slot as an example, and other units of the TTI are not described again. It is necessary to solve that which same scheduling signaling and which different scheduling signalings are used by multiple scheduled slots, and how to perform HARQ feedback on data in the multiple scheduled slots. The embodiments of the present application will be described in detail below with specific examples.

Example 1

An embodiment is directed to how a number of scheduled slots is determined in a multi-slot scheduling, and how a size of a bit field indicating the multi-slot scheduling is determined. The bit field indicating the multi-slot scheduling and its size are determined in one of following manners.

Manner one: a size (a number of bits) of a bit field for indicating a number of scheduled continuous slots is determined according to a ratio of a subcarrier spacing of a scheduled carrier to a subcarrier spacing of a scheduling carrier. As shown in Table 1, when a carrier with a cross-carrier scheduling of SCS=15 khz schedules a carrier of SCS=15 khz, then the size of the bit field is 1 bit, that is, whether only 1 slot or 2 continuous slots are supported to be scheduled; when a carrier with a cross-carrier scheduling of SCS=15 khz schedules a carrier of SCS=60 khz, then the size of the bit field is 2 bit, that is, only 1 slot or 2 continuous slots or 3 continuous slots or 4 continuous slots are supported to be scheduled; and when a carrier with a cross-carrier scheduling of SCS=15 khz schedules a carrier of SCS=120 khz, then the size of the bit field is 3 bits, that is, only 1 slot, 2 continuous slots, 3 continuous slots, 4 continuous slots, 5 continuous slots, 6 continuous slots, 7 continuous slots or 8 continuous slots are supported to be scheduled.

TABLE 1

| Size of the bit field | Meaning | Description |
|---|---|---|
| 1 | 0 represents scheduling 1 slot, 1 represents scheduling 2 continuous slots | Applicable to a scenario of $\log_2\left(\frac{2^{\mu_{PDSCH}}}{2^{\mu_{PDCCH}}}\right) = 1$, for example, 15 khz schedules 30 khz |
| 2 | 00 represents scheduling 1 slot, 01 represents scheduling 2 continuous slots, 10 represents scheduling 3 continuous slots, 11 represents scheduling 4 continuous slots | Applicable to a scenario of $\log_2\left(\frac{2^{\mu_{PDSCH}}}{2^{\mu_{PDCCH}}}\right) = 2$, for example, 15 khz schedules 60 khz |
| 3 | 000 represents scheduling 1 slot, 001 represents scheduling 2 continuous slots, 010 represents scheduling 3 continuous slots, 011 represents scheduling 4 continuous slots, 100 represents scheduling 5 slot, 101 represents scheduling 6 continuous slots, 110 represents scheduling 7 continuous slots, 111 represents scheduling 8 continuous slots | Applicable to a scenario of $\log_2\left(\frac{2^{\mu_{PDSCH}}}{2^{\mu_{PDCCH}}}\right) = 3$, for example, 15 khz schedules 120 khz |

Manner two: N or $2^N$ slots after a first slot are indicated whether to be scheduled or not through N bits. That is, the first slot is definitely scheduled by default, and the N or $2^N$ slots after the first slot are indicated whether to be scheduled or not through the N bits.

The first slot is determined through $$\left\lfloor n \cdot \frac{2^{\mu_{PDSCH}}}{2^{\mu_{PDCCH}}} \right\rfloor + K_0 \text{ or } \left\lfloor n \cdot \frac{2^{\mu_{PUSCH}}}{2^{\mu_{PDCCH}}} \right\rfloor + K_2.$$

Where n represents a slot where the PDCCH is located, $K_0$ is a timing interval determined based on a carrier where the PDSCH is located, $K_2$ is a timing interval determined based on a carrier where the PUSCH is located, and $\mu_{PUSCH}$, $\mu_{PDSCH}$ and $\mu_{PDCCH}$ represents subcarrier spacings of the PUSCH, the PDSCH and the PDCCH, respectively. A first slot location that is determined to be scheduled is indicated by $K_0$ or $K_2$, and a scheduling situation of subsequent slots are indicated by additional N bits, in particular in one of following manners. A manner 1, whether subsequent adjacent N slots being scheduled is indicated (i.e., whether (N+1) adjacent slots being scheduled is indicated in total, a non-continuous scheduling is supported); a manner 2, whether N slots in subsequent N belonging $K_0$ sets (the $K_0$ set depends on which $K_0$ values are configured during a time domain resource allocation of a radio resource control (RRC) parameter) being scheduled is indicated, and N slot positions are selected backwards from the $K_0$ values indicated in the DCI (i.e., whether slots in (N+1) $K_0$ sets being scheduled in total is indicated and a discontinuous scheduling is supported); a manner 3, 1, 2, . . . , $2^N$ continuous slots being scheduled in subsequent $2^N$ slots is indicated, that is, 2, . . . , ($2^N$+1) continuous slots in total are indicated, including the first slot; a manner 4, indicating 1, 2, . . . , $2^N$ continuous slots being scheduled in $2^N$ slots in a subsequent $K_0$ set is indicated, namely, 2, . . . , ($2^N$+1) continuous slots in total are indicated, including the first slot.

Manner three: a single-slot scheduling or a multi-slot scheduling is indicated through 1 bit, and a number of slots of the multi-slot scheduling is determined through a pre-definition or a RRC configuration.

The pre-definition may be determined according to $$\frac{2^{\mu_{PDSCH}}}{2^{\mu_{PDCCH}}}.$$

Manner four: a number of or a number of repetitions of a multi-slot scheduling is indicated through a same bit field.

In particular, when the multi-slot scheduling and the repetition cannot be supported at the same time, how to indicate is determined in one of following approaches. In approach one, a same bit field is used in the DCI, and whether the multi-slot scheduling or the repetition scheduling being indicated is determined through a RRC configuration. That is, one-out-of-two is supported by only a semi-statically. In approach 2, 1 bit is used in the DCI to indicate whether the multi-slot scheduling or the repetition scheduling, i.e., one-out-of-two is dynamically supported. Further, when sizes of bit fields indicating the multi-slot scheduling and the number of repetitions are not equal, when one of the sizes is fixed and the other is not fixed (RRC configuration or according to a preset rule), when a same bit field is used, another functional indication is reused from LSB to MSB (or reverse order) according to the bit fields with the fixed size in function, for example, the number of repetitions indicate that it is fixed to 2 bits, and when the multi-slot scheduling is 1 bit, only the 1 bit of the least significant bit (LSB) is reused. If the fixed size is not enough, the size is optionally increased, or it can only be determined that the upper limit is no longer increased in terms of the fixed size, i.e. bits with the most significant bit (MBS or MSB for short) are discarded.

Figure 4:
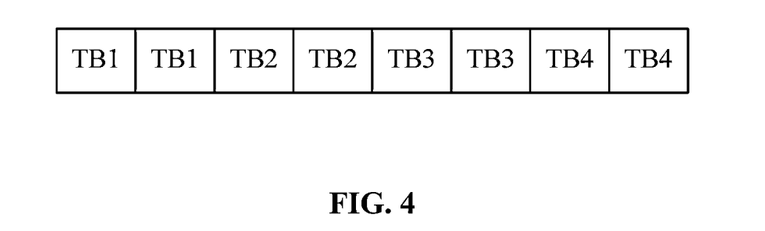
FIG. 4 is a schematic diagram one of a single DCI scheduling multiple slots according to an embodiment of the present application.
Figure 5:
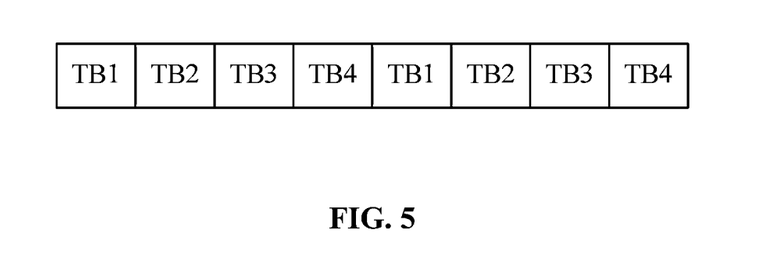
FIG. 5 is a schematic diagram two of a single DCI scheduling multiple slots according to an embodiment of the present application.

Specifically, FIG. 4 is a schematic diagram one of a single DCI scheduling multiple slots according to an embodiment of the present application, and FIG. 5 is a schematic diagram two of a single DCI scheduling multiple slots according to an embodiment of the present application, and as shown in FIGS. 4 and 5, when the multi-slot scheduling and the repetition may be supported at the same time, no matter whether the number of the multi-slot scheduling and the number of repetitions are jointly indicated or independently indicated, how to Repetition among the indicated N slots needs to be determined through the RRC/dynamic indication/preset rules. The candidate manner is one of following manners: the repetition is performed firstly and then the multi-slot scheduling is performed; a manner two, the multi-slot scheduling is firstly performed and then the repetition is performed. For example, assuming N=8 (a number of multi-slot scheduling) and R=2 (the number of repetitions), the execution manner of manner one is as shown in FIG. 4, starting from a starting slot determined by $K_0$, the repetition is firstly performed and then different TBs are performed; the execution manner of the manner two is shown in FIG. 5, and starting from a starting slot determined by $K_0$, difference TBs are firstly performed and then the repetition is performed; for another example: assuming that a number of multi-slot scheduling TBs is indicated as N=4, R=2 (the number of repetitions number), then a total number of slots needed is 4*2=8, and similarly, the execution manner of the manner one is shown in FIG. 4, starting from a starting slot determined by $K_0$, the repetition is firstly performed and then different TBs are performed; and the execution manner of the manner two is shown in FIG. 5, starting from a starting slot determined by $K_0$, difference TBs are firstly performed and then the repetition is performed.

Manner five: a number of slots is implicitly determined through the PDCCH.

Specifically, one of following approaches is included. In approach one, a multi-slot scheduling is determined through a starting control channel element (CCE) position, or a starting CCE position+M bits, for example, 1 bit in N bits required for the multi-slot scheduling is implicitly determined through an odd-even number of a starting CCE index, and the remaining N−1=M bits is determined through a display indication; for another example, whether the single-slot scheduling or the multi-slot scheduling is implicitly determined by the odd-even number number of the starting CCE index. In approach two, the multi-slot scheduling is determined through different candidates or aggregation levels or different candidates or aggregation levels+M bits, for example, 1 or 2 bits in N bits required for the multi-slot scheduling are implicitly determined through different candidates or aggregation levels, and the remaining N−1=M (or N−2=M) bits is determined through the display indication; for another example, whether the single-slot scheduling or the multi-slot scheduling is implicitly determined by different candidates or aggregation levels. The manner may be used as a means for saving the overhead of indicating the multi-slot indication.

Optionally, the continuous slot scheduling described in this embodiment refers to slots in a same transmission direction, preferably slots of in the same transmission direction and available continuously.

According to the multi-slot scheduling number indication method in the multi-slot scheduling method described in this embodiment, the multi-slot scheduling number bit field size is determined through the subcarrier spacing between the scheduled carrier and the scheduling carrier, or whether 1 or multiple slots after the first slot are scheduled or not is indicated, or other bit fields are reused or implicit determination is performed, so that the terminal is informed of the scheduling number and position of the multiple slots. At this time, the signaling overhead of a physical layer is reduced, and the performance of the downlink control channel is improved, while the multi-slot scheduling function is ensured.

Example 2

An embodiment is directed to how to determine a time domain resource allocation in multiple scheduled slots in a multi-slot scheduling. The time-domain resource allocation bit-field indicating the multi-slot scheduling is determined through one of following manners.

Manner one: a time domain resource allocation schedules, through a RRC configuration, a timing ($K_0$ or $K_2$), a starting symbol of a first slot, and optionally, an ending symbol in a last symbol. At this time, the starting symbol is the starting symbol in the first slot, the ending symbol is the ending symbol in the last slot, and the number of slots is assumed to be determined by a multi-slot scheduling number indication.

Manner two: a time domain resource allocation schedules, through a RRC configuration, a timing ($K_0$ or $K_2$), a starting symbol of a first slot, a number of scheduled slots, and optionally an ending symbol in a last symbol. At this time, the starting symbol is the starting symbol in the first slot, the ending symbol is the ending symbol in the last slot, and the slot number indication is increased relative to the manner one.

Manner three: a time domain resource allocation schedules, through a RRC configuration, a timing ($K_0$ or $K_2$), a starting symbol of a number of symbols, a number of scheduled slots. That is, compared with a time domain resource allocation in the related art, only the number of the scheduled slots is increased. Further, the number of the scheduled slots may be all slots including the first slot determined according to the scheduling timing, or other slots not including the first slot determined according to the scheduling timing.

Manner four: a time domain resource allocation schedules, through a RRC configuration, a timing ($K_0$ or $K_2$), and a starting symbol, a number of symbols and a number of scheduled slots are indicated for each slot or each group of slots. At this time, compared with a time domain resource allocation in the related art, only the number of the scheduled slots is increased. Further, the number of the scheduled slots may be all slots including the first slot determined according to the scheduling timing, or other slots not including the first slot determined according to the scheduling timing. The starting symbol and the number of symbols are not the same for each slot. For example, a starting symbol and a number of symbols of each slot are indicated for each slot scheduled (for example, 2 slots are scheduled, it is indicated that OS #3 is started by the first slot, L=7 OSs, it is indicated that OS #2 is started by the second slot, L=7 OSs); or different starting symbols and the numbers of the symbols and corresponding slots (for example, 4 slots are scheduled, it is indicated that OS #3 is started, L=11 and applies to the 1st slot and the 3rd slot, and it is indicated that OS #2 is started, L=12 and applies to the 2nd slot and the 4th slot) are indicated, where OS is an orthogonal frequency division multiplexing (OFDM) symbol.

Manner five: a time domain resource allocation schedules, through a RRC configuration, a timing ($K_0$ or $K_2$), a starting symbol of a number of symbols, a number of scheduled slots (optional), and a number of subslots/mini-slots within scheduled slots (optional). At this time, compared with a time domain resource allocation in the related art, only the number (optional) of the scheduled slots and the number (optional) of the subslots/mini-slots within the scheduled slots are increased. Further, a number of symbols in the time domain resource allocation in the subslots/mini-slots within the slots is the same as the indicated number of symbols. Preferably, each subslot/mini-slot continuously occupies time domain symbol resources. For example: the time domain resource allocation indicates that the starting symbol is OS #2, the number of symbols is L=2, the number of the scheduled slots is equal to 3, and the number of the subslot/mini-slots within the scheduled slots is 4, then the multi-slot scheduling transmits a total of 8 TTIs, where each slot transmits 4 TTIs, the 4 TTIs within the slot start at OS #2, occupy 8 OSs in succession, and each TTI occupies 2 OSs. Further, the sum of the number of symbols of each subslot/mini-slot within the slot is the indicated number of symbols. Preferably, each subslot/mini-slot determines a respective symbol length in an equally divided manner, or a preset or configured symbol length pattern. Preferably, each subslot/mini-slot continuously occupies time domain symbol resources. For example: the time domain resource allocation indicates that the starting symbol is OS #2, the number of symbols is L=8, the number of the scheduled slots is equal to 3, and the number of subslots/mini-slots within the scheduled slots is 4, then the multi-slot scheduling transmits a total of 8 TTIs, where each slot transmits 4 TTIs, the 4 TTIs within the slot start at OS #2, occupy 8 OSs in succession, and each TTI occupies 8/4=2 OSs. Further, the number of the scheduled slots may be all slots including the first slot determined according to the scheduling timing, or other slots not including the first slot determined according to the scheduling timing.

Further, based on any one of the above manners, the scheduled traffic channels use only available symbols in each slot, e.g., only D or X symbols are used for the PDSCH, and no transmission (puncturing or rate matching) is performed if it is the U symbol; for the PUSCH, only X or U symbols are used, not transmission is performed if it is the D symbol (a puncturing or a rate matching).

Further, based on any one of the above manners, according to a possible candidate time domain resource allocation table configured by the RRC, one of the candidate time domain resource allocation tables is dynamically indicated through the DCI.

According to the multi-slot scheduling time domain resource allocation indication method in the multi-slot scheduling method described in this embodiment, the multi-slot scheduling starting symbol is indicated, or the number of the multi-slot scheduling is further included, or the ending symbol is further included, or different starting symbols and lengths applied to different slots, the time domain resource allocation when the terminal is notified of the multi-slot scheduling is realized. At this time, the situation that the signaling overhead of the physical layer is not changed is maintained, and the flexibility of the time domain resource allocation of certain multi-slot scheduling is ensured, while the multi-slot scheduling function is ensured.

Example 3

An embodiment is directed to how to determine HARQ feedback time sequences and feedback resources corresponding to multiple scheduled slots in a downlink PDSCH multi-slot scheduling. The HARQ feedback of the multi-slot scheduling of the PDSCH is determined through one of following manners.

Figure 6:
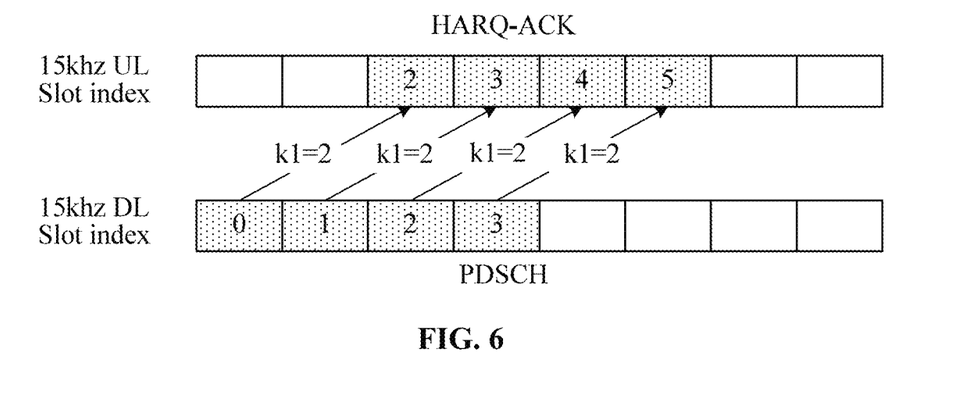
FIG. 6 is a schematic diagram three of a single DCI scheduling multiple slots according to an embodiment of the present application.

Manner one: each scheduled slot independently determines an uplink slot where corresponding HARQ-ACK information is located according to a feedback timing $K_1$ indication in the DCI (DL assignment); FIG. 6 is a schematic diagram three of a single DCI scheduling multiple slots according to an embodiment of the present application, as shown in FIG. 6, PDSCH transmissions in 4 DL slots are scheduled for each TB to determine the feedback by using the respective slot as a timing starting point and according to the $K_1$ indicated in the DCI.

When the HARQ-ACK uses a semi-static codebook for feedback, if there is no DCI for the PDSCH determined using the configured $K_1$ set, it is assumed that a DCI using the multi-slot scheduling is used as a last DCI. For example, if a $K_1$ set configured at this time is 2, 3, at this time, UL slot #4 is used as an example, when the UL slot #4 determines the PUCCH resource for the last DCI, if it finds a partial PDSCH for the multi-slot scheduling (i.e., PDSCH in DL slots #1, 2 in FIG. 6) according to the $K_1$ set but does not have any DCI, and at this time, it is assumed that the multi-slot scheduling DCI is the last DCI, and it is assumed that there is no unicast PDSCH other than the PDSCH of the multi-slot scheduling at this time. Or the base station is required to guarantee that the configured $K_1$ set always contains the DCI for the multi-slot scheduling. In addition, if the DCI scheduling the multi-slot transmission is before a slot 0, and there are no other DCI when the codebook window is determined at this time, the set contains the slot in which a DCI that sent the multi-slot scheduling before the slot 0 is located.

When the HARQ-ACK uses a dynamic codebook for feedback, when UEs feed back the HARQ-ACK to TBs in a slot that is not after the first slot, the respective slot is used as the timing starting point, a (UL) slot is determined according to $K_1$ (delay if an unavailable slot is encountered in a time division duplex (TDD for short)), and the ACK/NACK bit is determined in the HARQ-ACK codebook for this slot; furthermore, if the HARQ-ACK of the TB scheduled by the other DCI needs to be fed back at this slot, then the count downlink assignment index (DAI for short) in the DCI scheduling other TBs needs to be counted from 1 (or more accurately described as the count DAI of at least one of the DCI scheduling other TBs needs to be additionally added with 1, i.e., a count DAI of the first DCI is added with 1, and a count DAI of a non-first DCI is added with 2, it should be noted that the addition of 1 or 2 described in this paragraph is merely the addition of 1 or 2 to the value in the DAI domain, since the DAI indicates that 00 represents 1 count, 01 represents 2 counts, 10 represents 3 counts, and 11 represents 4 counts; the specific position of the TB in the slot after the non-first slot in the multi-slot scheduling in the HARQ-ACK codebook in the slot is a counting position additionally added with 1). It should be noted that if the slot (TDD) found by each slot according to the $K_1$ indication has no uplink resource, then $K_1$ extends backwards to a nearest slot with the uplink resource, and the ACK/NACK multiplexing is executed in the subsequent slot. Or, count DAI also remains consistent with R15, only a number of currently scheduled PDSCHs (with PDCCH) is counted, and similarly, a SPS PDSCH is put at the end of the codebook, where PDSCH that has not yet been fed back may be put at the beginning of the codebook. Further, the order in the codebook may be determined in terms of CC index from low to high, or in terms of CC first and then time domain.

Or, when the HARQ-ACK uses the dynamic codebook for feedback, it is necessary to add 1 to the DCI of the multi-slot scheduling at a count DAI, and the codebook size is determined by codebook according to an actual number of scheduling of the multi-slot scheduling and before the UL slot of the HARQ-ACK is sent. For the TB in the subsequent slot, it is necessary to include the feedback bit corresponding to the TB in the ACK/NACK codebook in the UL slot of the subsequent slot n+$K_1$ (that is, only the feedback information of the TB (there is no newly scheduled DCI at this time), or if there is other scheduling at this time (no matter a single slot scheduling or a multi-slot scheduling, for example, it may be a case that other scheduling occurs for 7 occasions UE supporting capability 3-5b), the count DAI of at least one of the subsequent DCI needs to be added by 1 count.

Figure 7:
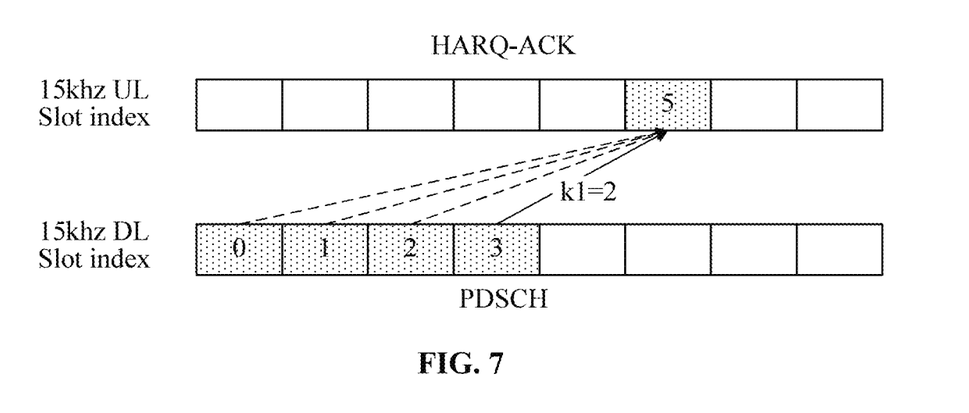
FIG. 7 is a schematic diagram four of a single DCI scheduling multiple slots according to an embodiment of the present application.

Manner two: the scheduled slots are indicated according to the feedback timing $K_1$ in the DCI (DL assignment) and an uplink slot where the HARQ-ACK information corresponding to all slots is located are determined uniformly according to a last slot. FIG. 7 is a schematic diagram four of a single DCI scheduling multiple slots according to an embodiment of the present application, and as shown in FIG. 7, each TB scheduling a PDSCH transmission in 4 DL slots determines a feedback timing according to the $K_1$ indicated in the DCI and using the last slot as a timing start point.

When the HARQ-ACK uses a semi-static codebook for feedback, if there is no DCI for the PDSCH determined using the configured $K_1$ set, it is assumed that the DCI using the multi-slot scheduling is used as the last DCI. For example, if the $K_1$ set configured at this time is 2, 3, 4, 5, when UL slot #5 is used as an example at this time, when the UL slot #5 determines a PUCCH resource for last DCI, if it finds partial PDSCH for the multi-slot scheduling according to the $K_1$ set (i.e., PDSCH in DL slots #0, 1, 2, 3 in FIG. 7) but does not have any DCI (assuming that a DCI scheduling the multi-slot transmission at this time is before the slot 0), and at this time, the multi-slot scheduling DCI is assumed to be last DCI, assuming that there is no unicast PDSCH other than the multi-slot scheduling PDSCH at this time. Or the base station is required to guarantee that the configured $K_1$ set always contains the DCI for the multi-slot scheduling. In addition, if the DCI scheduling the multi-slot transmission is before slot 0, and no other DCI is determined at this time when the codebook window is determined, then the $K_1$ set contains a slot where the DCI sending the multi-slot scheduling is located before the slot 0.

When the HARQ-ACK uses a dynamic codebook for feedback, it is only necessary to add 1 to the DCI in the count DAI, and the size of the codebook is determined according to the actual scheduling number of the multi-slot scheduling.

According to this embodiment, each TB is allowed to perform an independent feedback, and the UE may be ensured to find a corresponding DCI to determine the PUCCH resource, so that this time delay during the multi-slot scheduling is reduced, while the multi-slot scheduling function is ensured.

Example 4

An embodiment is directed to how to determine a CBGTI (CBG transmission information) and CBGFI (CBG flushing out information) indication corresponding to multiple scheduled slots when a code block group (CBG) manner of transmission is supported in a downlink PDSCH multi-slot scheduling. A CBGTI of a multi-slot scheduling is determined through one of following manners.

Manner one: CBGTI in each slot is independently indicated, each slot uses M/Nbit, N is a number of scheduled slots, and M is a maximum CBG number configured by RRC; Manner two: uniform indication is performed, slots with the NDI not toggled share a same CBGTI indication, and slots with the NDI toggled ignore a CBGTI indication. Different point from NR R15 in the related art: two CWs split the configured M bits, assuming M=8 bits, i.e., 4 bits are used for each CW. In the embodiments of the present application, the configured M=8 bits is applied to the TB in which an error occurs, and each TB uses a same CBGTI indication. Preferably, a specific implementation manner is that an "OR" operation is performed to determine the CBGTI indication in wrong CBGs in wrong TBs, for example, 2 slots are scheduled, CBG #0, 1 in the first slot needs to be retransmitted, CBG #0, 3 in the second slot needs to be retransmitted, then the CBGTI indicates that the retransmitted CBG is CBG #0, 1, 3 when the multi-slot scheduling is retransmitted).

The CBGFI of the multi-slot scheduling is determined through one of following manners.

Manner one: CBGFI in each slot is independently indicated, N bits are used for indication, and for scheduled N slots, 1 bit is used for each slot; or N1 bits are used, N1 is not greater than N, i.e. the CBGFI is indicated only for slots where the NDI is not toggled.

Manner two: slots where a new data indicator (NDI for short) is not toggled sharing a same CBGFI indication is uniformly indicated, and slots where the NDI is toggled ignore the CBGFI indication. Preferably, a specific implementation manner is to determine the 1-bit CBGFI in the multi-slot scheduling after "AND" operation of the CBGFI determined by each retransmission TB alone, for example, 2 slots are scheduled, CBGFI=0 in the first slot represents that the data may be contaminated, and CBGFI=1 in the second slot represents that the data may be merged with a same CBG as before, then CBGFI=0 is indicated when the multi-slot scheduling is retransmitted, which represents the data may be contaminated.

According to the embodiment, multiple TBs are allowed to share a same CBGTI or CBGFI, the CBG retransmission function may be ensured, and at this time, the physical layer indication overhead during the multi-slot scheduling is reduced, and the performance of the downlink control channel is improved, while the multi-slot scheduling function is ensured.

Example 5

This embodiment is directed to how to determine DMRS pattern in scheduled multiple slots in downlink PDSCH multi-slot scheduling. The DMRS pattern for 调和 multi-slot scheduling is determined through one of following manners.

Manner one: all slots use a same DMRS pattern which is the same as that in the first slot, and the DMRS pattern of the first slot is determined by combining a time domain resource allocation (TRA) indicated by the DCI with a RRC configuration.

Manner two: when the time domain resource allocation (TRA) indicates the first slot starting symbol+the number of slots (optional)+the end slot ending symbol (optional), the DMRS pattern indicates a slot for the first or last or non-0 starting symbol, a slot of continuous occupation 14 OS may be preconfigured/DMRS pattern indicated+offset/implicitly determined.

For example, the first slot (PDSCH with 12 OSs) uses a symbol 9 as an additional DMRS (assuming that RRC configures 2 additional DMRS at this time), while the RRC configures 4 additional DMRS in slots continuously occupying 14 OSs, i.e. the RRC configures additional DMRS to distinguish between the first non-14 OS slot and the subsequent 14 OS slot.

Manner three: on the basis of the method one, the TTI pattern is configured to apply the DMRS. For example, the 4 TTI configuration 1010 supports only the 1st slot, 3rd slot with DMRS, while the 2nd slot, the 4th slot has no DMRS or additional DMRS.

According to the embodiment, multiple TBs are allowed to share a same DMRS pattern or a DMRS pattern with a reduced density, so that the certain scheduling flexibility is provided according to the requirements of high speed, low speed and the like for different pilot frequency densities.

Through the description of the above embodiments, those skilled in the art may clearly understand that the method according to the above embodiments may be implemented by means of software plus a necessary universal hardware platform, and of course, may also be implemented by hardware, but in many cases the former is a better implementation. Based on this understanding, the technical scheme of the present disclosure, either essentially or in terms of contributions to the related art, may be embodied in the form of a software product, which is stored in a storage medium (such as a ROM/RAM, a magnetic disk, an optical disc), and includes several instructions for causing a terminal device (which may be a mobile phone, a computer, a server, or a network device, etc.) to perform the methods described in the embodiments of the present application.

Embodiment 2

An apparatus for transmitting downlink control information is further provided in an embodiment, the apparatus is used for implementing the above embodiments and preferred embodiments, which have been explained without further details. As used below, the term "module" may be a combination of software and/or hardware that implements a predetermined function. Although the apparatus described in the embodiments below is preferably implemented in software, implementations in hardware, or a combination of software and hardware, are also possible and contemplated.

Figure 8:
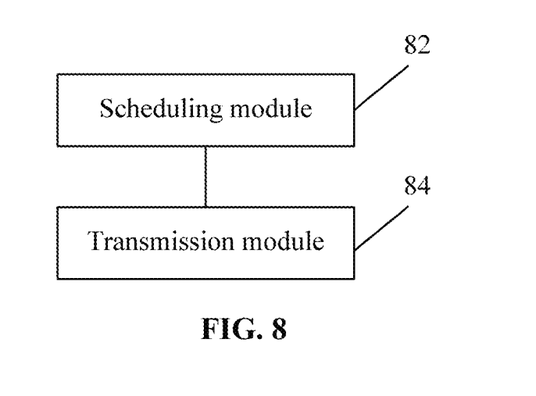
FIG. 8 is a block diagram of an apparatus for transmitting downlink control information according to an embodiment of the present application.

FIG. 8 is a block diagram of an apparatus for transmitting downlink control information according to an embodiment of the present application, as shown in FIG. 8, the apparatus includes a scheduling module 82 and a transmitting module 84. The scheduling module 82 is configured to schedule traffic channels in multiple transmission time intervals (TTIs) through a single downlink control information (DCI), where a subcarrier spacing of a carrier where the scheduled traffic channel is located is not smaller than a subcarrier spacing of a carrier where the DCI scheduling the traffic channel is located. The transmitting module 84 is configured to transmit the DCI.

Optionally, the scheduling module 82 includes a first indication submodule, a first determination unit, a first indication unit, a second indication unit, a third indication unit and a second determination unit. The first indication submodule is configured to indicate a number of scheduled TTIs in one of following manners by the DCI. The first determination unit is configured to determine a bit number of a bit field of the number of the scheduled TTIs according to a subcarrier spacing of a scheduled carrier and a subcarrier spacing of a scheduling carrier. The first indication unit is configured to indicate scheduled TTIs in at most N or $2^N$ TTIs except and after a first scheduled TTI by N bits, where the $2^N$ TTIs are continuous TTIs, and N is a natural number. The second indication unit is configured to indicate a single TTI scheduling or a multi-TTI scheduling by 1 bit. The third indication unit is configured to indicate a number of TTIs or a number of repetitions of a multi-TTI scheduling through a same bit field. The second determination unit is configured to implicitly determine, through a physical downlink control channel (PDCCH), a number of TTIs of a multi-TTI scheduling.

Optionally, the first determination unit is further configured to determine the bit number of the bit field of the number of the scheduled TTIs according to the subcarrier spacing of the scheduled carrier and the subcarrier spacing of the scheduling carrier in following manner:

$$\log_2 \frac{2^{\mu_{PDSCH}}}{(2^{\mu_{PDCCH}})} \text{ or } \log_2 \frac{2^{\mu_{PUSCH}}}{(2^{\mu_{PDCCH}})},$$

Where, $\mu_{PDSCH}$ is an index of a subcarrier spacing of a physical downlink shared channel (PDSCH) of the scheduled carrier, $\mu_{PUSCH}$ is an index of a subcarrier spacing of a physical uplink shared channel (PUSCH) of the scheduled carrier, and $\mu_{PDCCH}$ is an index of a subcarrier spacing of the PDCCH of the scheduled carrier.

Optionally, the characteristic that the first indication unit is further configured to indicate, by the N bits, the scheduled TTIs in the at most N or $2^N$ TTIs except and after the first scheduled TTI includes one of: whether each TTI of adjacent N TTIs after the first TTI is scheduled or not is indicated by the N bits; whether each TTI of N TTIs belonging to a first set after the first TTI is scheduled or not is indicated by the N bits, where the N TTIs are N TTI positions selected backwards in the first set from a value of an element A in the first set indicated in the DCI, and the first set is all values of timing intervals in a time domain resource allocation configured by high-layer signaling; x continuous TTIs scheduled in $2^N$ TTIs after the first TTI are indicated by the N bits, where x=1, 2, . . . , $2^N$; or x continuous TTIs scheduled in $2^N$ TTIs belonging to a first set after the first TTI are indicated by the N bits, where x=1, 2, . . . , $2^N$, and the $2^N$ TTIs are $2^N$ TTI positions selected backwards in the first set from a value of an element A in the first set indicated in the DCI, and the first set is all values of timing intervals in a time domain resource allocation configured by high-layer signaling.

Optionally, the third indication unit is further configured to indicate the number of the TTIs or the number of repetitions of the multi-TTI scheduling through the same bit field in one of following manners: the number of the TTIs or the number of repetitions of the multi-TTI scheduling is indicated through the same bit field and determined by high-layer signaling configuration; or the number of the TTIs or the number of repetitions of the multi-TTI scheduling is indicated through the same bit field and determined by physical signaling indication.

Optionally, the second determination unit is further configured to implicitly determine the number of the TTIs of the multi-TTI scheduling through the related parameter of the PDCCH includes one of: the number of the TTIs of the multi-TTI scheduling is determined through a starting CCE position; the number of the TTIs of the multi-TTI scheduling is determined through a starting CCE position and an M-bit indication; the number of the TTIs of the multi-TTI scheduling is determined through a candidate position or an aggregation level; the number of the TTIs of the multi-TTI scheduling is determined through a candidate position and M bits; or the number of the TTIs of the multi-TTI scheduling is determined through an aggregation level and an M-bit indication; where M is less than N.

Optionally, the apparatus further includes an execution module. The execution module is configured to: when the DCI is used for indicating a number of TTIs and a number of repetitions of a multi-TTI scheduling, firstly perform a repetitive transmission and then perform a transmission of a different transmission block, or firstly perform transmissions of different transmission blocks and then perform a repetitive transmission.

Optionally, the scheduling module 82 includes a second indication submodule. The second indication submodule is configured to indicate a time domain resource allocation by the DCI in one of following manners: a timing interval, a starting symbol of a first TTI, and an ending symbol in a last TTI are configured through high-layer signaling; a timing interval, a starting symbol of a first TTI, a number of scheduled TTIs, and an ending symbol in a last TTI are configured through high-layer signaling; a timing interval, a starting symbol of a first TTI, a number of symbols, and a number of scheduled TTIs are configured through high-layer signaling; a timing interval, a starting symbol and a number of symbols indicated for each TTI or each group of TTIs, and a number of scheduled TTIs are configured through high-layer signaling, where the starting symbol and the number of the symbols are not all the same for individual TTI; or a timing interval, a starting symbol of a first TTI, a number of symbols, a number of scheduled TTIs, and a number of subslots/mini-slots within the scheduled TTIs are configured through high-layer signaling.

Optionally, when the physical downlink shared channel (PDSCH) is transmitted in the multiple TTIs, a manner of performing a hybrid automatic repeat request-acknowledgement (HARQ-ACK) feedback on the PDSCH includes one of: each TTI is used as a timing starting point by each TTI of the multiple TTIs, and an uplink TTI where HARQ-ACK information corresponding to the each TTI is located is determined according to a feedback timing $K_1$ indicated by the DCI, individually; or a last TTI is used as a timing starting point by each TTI of the multiple TTIs, and an uplink TTI where HARQ-ACK information corresponding to the multiple TTIs is located is determined according to a feedback timing $K_1$ in the DCI.

Optionally, the apparatus further includes a first determination module. The first determination module is configured to determine coding block group transmission information (CBGTI) by the DCI in one of following manners: a CBGTI of each TTI of the multiple TTIs is independently indicated, where each TTI uses X/Y bits, X is a number of scheduled TTIs, and Y is a maximum number of coding block groups (CBGs) configured by a radio resource control (RRC); or a same CBGTI is shared by multiple TTIs, where TTIs where a new data indicator (NDI) is not toggled share a same CBGTI indication, and TTIs where the NDI is toggled ignore a CBGTI indication.

Optionally, the apparatus further includes a second determination module. The second determination module is configured to determine coding block group refresh information (CBGFI) by the DCI in one of following manners: CBGFI for each TTI of the multiple TTIs is independently indicated, where 1 bit is used for the each TTI for a maximum of N scheduled TTIs; or using N1 bits to indicate CBGFI of TTIs where a new data indicator (NDI) is not toggled, where N1 is not greater than N; or multiple TTIs share same CBGFI, where TTIs where an NDI is not toggled share a same CBGFI indication, and TTIs where the NDI is toggled ignore a CBGFI indication.

Optionally, a demodulation reference signal pattern (DMRS pattern) in the multiple TTIs is determined in one of following manners: a same DMRS pattern is used by the multiple TTIs and is the same as a DMRS pattern in a first TTI, and the DMRS pattern in the first TTI is determined by combining a time domain resource allocation with a RRC configuration; a DMRS pattern in a first TTI is determined by combining a time domain resource allocation with an RRC configuration, and a first DMRS pattern is used for a TTI continuously occupying 14 orthogonal frequency division multiplexing symbols (OSs), where the first DMRS pattern is determined by a RRC or a predefined manner; or a same DMRS pattern is used by the multiple TTIs and is the same as a DMRS pattern in a first TTI, TTIs applying the DMRS pattern are determined by configuring a TTI pattern, where the DMRS pattern of the first TTI is determined by combining a time domain resource allocation with a radio resource control (RRC) configuration.

It should be noted that the above-described modules may be implemented by software or hardware, and the latter may be implemented in following manners, but is not limited thereto: the above-described modules are located in a same processor; or, the above-described modules, in any combination, are located in different processors.

Embodiment 3

An embodiment of the present application further provides a storage medium. The storage medium stores a computer program, and the computer program is configured to perform, when executed, the steps in any one of the method embodiments described above.

Optionally, in this embodiment, the above-described storage medium may be configured to store a computer program for performing following steps:

In S11, traffic channels in multiple transmission time intervals (TTIs) are scheduled through a single downlink control information (DCI), where a subcarrier spacing of a carrier where the scheduled traffic channel is located is not smaller than a subcarrier spacing of a carrier where the DCI scheduling the traffic channel is located; and In S12, the DCI is transmitted.

Optionally, in the present embodiment, the storage medium described above may include, but is not limited to, a USB flash drive, a read-only memory (ROM for short), a random access memory (RAM for short), a removable hard disk, a magnetic disk, an optical disc, or any other medium that may store a computer program.

Embodiment 4

An embodiment of the present application further provides an electronic apparatus. The electronic apparatus includes a memory and a processor. The memory stores a computer program. The processor is configured to execute the computer program to perform the steps in any one of the method embodiments described above.

Optionally, the electronic apparatus described above may further include a transmission device connected to the processor described above and an input and output device connected to the processor described above.

Optionally, in this embodiment, the processor described above may be configured to perform following steps by the computer program:

In S11, traffic channels in multiple transmission time intervals (TTIs) are scheduled through a single downlink control information (DCI), where a subcarrier spacing of a carrier where the scheduled traffic channel is located is not smaller than a subcarrier spacing of a carrier where the DCI scheduling the traffic channel is located; and In S12, the DCI is transmitted.

Optionally, a specific example in this embodiment may refer to the examples described in the above-described embodiments and the optional embodiment, and details are not described again in this embodiment.

Apparently, it should be understood by those skilled in the art that each of the above-described modules or steps of the present application may be implemented by a general-purpose computing device, the modules or steps may be concentrated on a single computing device or distributed on a network composed of multiple computing devices, and optionally, the modules or steps may be implemented by program codes executable by the computing devices, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The foregoing description is merely a preferred embodiment of the present application and is not intended to limit the present application. Various modifications and changes may be made to the present application by those skilled in the art. Any modification, equivalent replacement, improvement, etc. made within the principles of the present application shall be included within the scope of protection of the present application.

What is claimed is:

1. A method for transmitting downlink control information (DCI), comprising:
scheduling traffic channels in a plurality of transmission time intervals (TTIs) through a single downlink control information (DCI); and
receiving the DCI by a device;
wherein the scheduling the traffic channels in the plurality of TTIs through the single DCI comprises: indicating, through one bit-field in the single DCI, a number of TTIs or a number of repetitions of a multi-TTI scheduling, the one bit-field refers to that a bit-field indicating the number of TTIs is same as a bit-field indicating the number of repetitions.

2. The method of claim 1, wherein the number of the TTIs or the number of repetitions of the multi-TTI scheduling is indicated through the one bit-field in one of following manners:
determining, through high-layer signaling configuration by using the one bit-field, the number of the TTIs or the number of repetitions of the multi-TTI scheduling; or
determining, through physical signaling indication by using the one bit-field, the number of the TTIs or the number of repetitions of the multi-TTI scheduling.

3. The method of claim 1, wherein the scheduling the traffic channels in the plurality of TTIs through the single DCI comprises:
indicating, by the DCI, a time domain resource allocation in one of following manners:
configuring, through high-layer signaling, a timing interval, a starting symbol of a first TTI, and an ending symbol in a last TTI;
configuring, through high-layer signaling, a timing interval, a starting symbol of a first TTI, a number of scheduled TTIs, and an ending symbol in a last TTI;
configuring, through high-layer signaling, a timing interval, a starting symbol of a first TTI, a number of symbols, and a number of scheduled TTIs;
configuring, through high-layer signaling, a timing interval $K_0$ or $K_2$, a starting symbol and a number of symbols indicated for each TTI or each group of TTIs, and a number of scheduled TTIs, wherein the starting symbol and the number of the symbols are not all the same for individual TTI; or
configuring, through high-layer signaling, a timing interval, a starting symbol of a first TTI, a number of symbols, a number of scheduled TTIs, and a number of subslots/mini-slots within the scheduled TTIs.

4. The method of claim 3, wherein the TTI is a slot, and a subslot is a length L of a time domain resource allocated for a single transport block (TB).

5. The method of claim 1, wherein in a case where a physical downlink shared channel (PDSCH) is transmitted in the plurality of TTIs, a manner of performing a hybrid automatic repeat request-acknowledgement (HARQ-ACK) feedback on the PDSCH comprises one of:
using, by each TTI of the plurality of TTIs, the each TTI as a timing starting point, and determining, according to a feedback timing $K_1$ indicated by the DCI, an uplink TTI where HARQ-ACK information corresponding to the each TTI is located, individually; or
using, by each TTI of the plurality of TTIs, a last TTI as a timing starting point, and determining, according to a feedback timing $K_1$ in the DCI, an uplink TTI where HARQ-ACK information corresponding to the plurality of TTIs is located.

6. The method of claim 5, further comprising:
in a case where HARQ-ACK is fed back through a semi-static codebook and a PDSCH determined by using a $K_1$ set configured by high-layer signaling belongs to a PDSCH in a multi-TTI scheduling, determining the DCI scheduling the PDSCH as a last DCI.

7. The method of claim 5, wherein the using, by each TTI of the plurality of TTIs, the each TTI as the timing starting point, and determining, according to the feedback timing $K_1$ indicated by the DCI, the uplink TTI where the HARQ-ACK information corresponding to the each TTI is located, individually comprise one of:
in a case where HARQ-ACK is fed back through a dynamic codebook and there are HARQ-ACKs which are fed back for scheduling a first PDSCH and indicate a same uplink TTI, adding additionally one to a downlink allocation index (DAI) of at least one DCI of DCIs for scheduling the first PDSCH; or
in a case where HARQ-ACK is fed back through a dynamic codebook and there are HARQ-ACKs which are fed back for scheduling a first PDSCH and indicate one same uplink TTI, determining that HARQ-ACK information corresponding to PDSCHs of a multi-TTI scheduling is located at the beginning of the dynamic codebook.

8. The method of claim 7, further comprising:
in a case where the HARQ-ACK information corresponding to the PDSCHs of the multi-TTI scheduling is located at the beginning of the dynamic codebook, ordering the PDSCHs of the multi-TTI scheduling according to one of following principles:
ordering, at the beginning of the codebook, according to an order of a carrier (CC) indexes and then according to an order of time domain; or
ordering, at the beginning of the codebook, according to an order of time domain and then according to an order CC indexes.

9. The method of claim 5, wherein the using, by each TTI of the plurality of TTIs, the last TTI as the timing starting point and determining, according to the feedback timing $K_1$ in the DCI, the uplink TTI where the HARQ-ACK information corresponding to the plurality of TTIs is located comprise:
in a case where the HARQ-ACK uses a dynamic codebook for feedback and 1 is added to the DCI by a count DAI, determining a size of the codebook according to an actual scheduled number for scheduling the plurality of TTIs.

10. The method of claim 1, further comprising:
determining, by the DCI, coding block group transmission information (CBGTI) in one of following manners:
independently indicating a CBGTI of each TTI of the plurality of TTIs, wherein each TTI uses X/Y bits, X is a number of scheduled TTIs, and Y is a maximum number of coding block groups (CBGs) configured by a radio resource control (RRC); or
sharing, by a plurality of TTIs, a same CBGTI, wherein TTIs where a new data indicator (NDI) is not toggled share a same CBGTI indication, and TTIs where the NDI is toggled ignore a CBGTI indication.

11. The method of claim 1, further comprising:
determining, by the DCI, coding block group refresh information (CBGFI) in one of following manners:
independently indicating CBGFI for each TTI of the plurality of TTIs, wherein 1 bit is used for the each TTI for a maximum of N scheduled TTIs; or using N1 bits to indicate CBGFI of TTIs where a new data indicator (NDI) is not toggled, wherein N1 is not greater than N; or
sharing, by a plurality of TTIs, a same CBGFI, wherein TTIs where an NDI is not toggled share a same CBGFI indication, and TTIs where the NDI is toggled ignore a CBGFI indication.

12. The method of claim 1, wherein a demodulation reference signal (DMRS) pattern in the plurality of TTIs is determined in one of following manners:
using, by the plurality of TTIs, a same DMRS pattern, wherein such same DMRS pattern is the same as a DMRS pattern in a first TTI, and the DMRS pattern in the first TTI is determined by combining a time domain resource allocation with an RRC configuration;
determining a DMRS pattern in a first TTI by combining a time domain resource allocation with an RRC configuration, and using a first DMRS pattern for a TTI continuously occupying 14 orthogonal frequency division multiplexing symbols (OSs), wherein the first DMRS pattern is determined by an RRC or a predefined manner; or
using, by the plurality of TTIs, a same DMRS pattern, wherein such same DMRS pattern is the same as a DMRS pattern in a first TTI, and determining, by configuring a TTI pattern, TTIs applying the DMRS pattern, wherein the DMRS pattern of the first TTI is determined by combining a time domain resource allocation with an RRC configuration.

13. A non-transitory storage medium, storing a computer program, wherein the computer program is configured to perform, when executed, the following steps:
scheduling traffic channels in a plurality of transmission time intervals (TTIs) through a single downlink control information (DCI); and
receiving the DCI by a device;
wherein the scheduling the traffic channels in the plurality of TTIs through the single DCI comprises: indicating, through one bit-field in the single DCI, a number of TTIs or a number of repetitions of a multi-TTI scheduling, the one bit-field refers to that a bit-field indicating the number of TTIs is same as a bit-field indicating the number of repetitions.

14. An electronic apparatus, comprising a memory and a processor, wherein the memory stores a computer program, and the processor is configured to execute the computer program to perform the following steps:
scheduling traffic channels in a plurality of transmission time intervals (TTIs) through a single downlink control information (DCI); and
receiving the DCI by a device;
wherein the scheduling the traffic channels in the plurality of TTIs through the single DCI comprises: indicating, through one bit-field in the single DCI, a number of TTIs or a number of repetitions of a multi-TTI scheduling, the one bit-field refers to that a bit-field indicating the number of TTIs is same as a bit-field indicating the number of repetitions.

* * * * *